(12) United States Patent
Day

(10) Patent No.: US 6,623,265 B1
(45) Date of Patent: Sep. 23, 2003

(54) MOULD FOR THE MANUFACTURE OF A FAN HAVING HUB AND A PLURALITY OF HELICAL BLADES EXTENDING FROM THE HUB

(75) Inventor: Terence Robert Day, Mt Tamborine (AU)

(73) Assignee: Jetfan Technology Limited, Arundel (AU)

(*) Notice: Subject to any disclaimer, the term of this patent is extended or adjusted under 35 U.S.C. 154(b) by 0 days.

(21) Appl. No.: 09/786,345

(22) PCT Filed: Dec. 23, 1999

(86) PCT No.: PCT/AU99/01155
§ 371 (c)(1),
(2), (4) Date: Mar. 12, 2001

(87) PCT Pub. No.: WO00/38896
PCT Pub. Date: Jul. 6, 2000

(30) Foreign Application Priority Data

Dec. 23, 1998 (AU) .............................................. PP7876
Jan. 29, 1999 (AU) .............................................. PP8367

(51) Int. Cl.$^7$ .............................................. B29C 33/44
(52) U.S. Cl. ............... 425/438; 425/443; 425/DIG. 58; 249/59
(58) Field of Search .................... 425/542, 588, 425/438, 450.1, DIG. 58, 443; 249/59

(56) References Cited

U.S. PATENT DOCUMENTS

| | | | |
|---|---|---|---|
| 4,043,385 A | * | 8/1977 | Petrenchik .................... 164/342 |
| 4,871,505 A | | 10/1989 | Lapeyre ....................... 264/328.1 |
| 5,409,656 A | * | 4/1995 | Naruse et al. ............... 249/137 |
| 5,547,365 A | | 8/1996 | Chuang ........................ 425/577 |

FOREIGN PATENT DOCUMENTS

| | | |
|---|---|---|
| DE | 4428161 | 7/1995 |
| JP | 62117717 | 5/1987 |
| JP | 63005916 | 1/1988 |
| JP | 8066745 | 3/1996 |
| WO | PCT/EP97/01764 | 4/1997 |

* cited by examiner

*Primary Examiner*—James P. Mackey
*Assistant Examiner*—Donald Heckenberg
(74) *Attorney, Agent, or Firm*—Hoffman, Wasson & Gitler, PC

(57) ABSTRACT

A mold for the manufacture of a fan having a hub and a plurality of helical blades extending from the hub. The mold cavity is designed with a specific shape to produce the helical blades of the fan. The mold is comprised of two mold parts. At least one of the mold parts is freely rotatable such that upon separation of the mold parts, the formed fan causes the rotatable mold part to autorotate as it is pulled away from the other mold part.

2 Claims, 4 Drawing Sheets

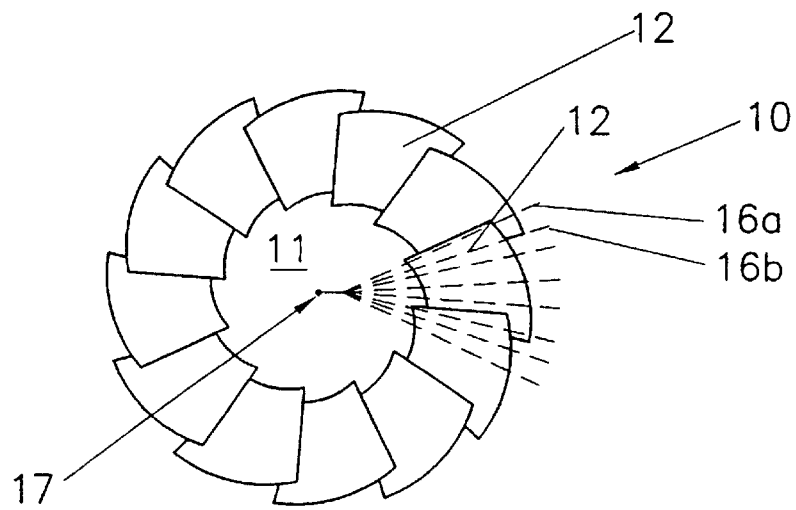
Figure 1.
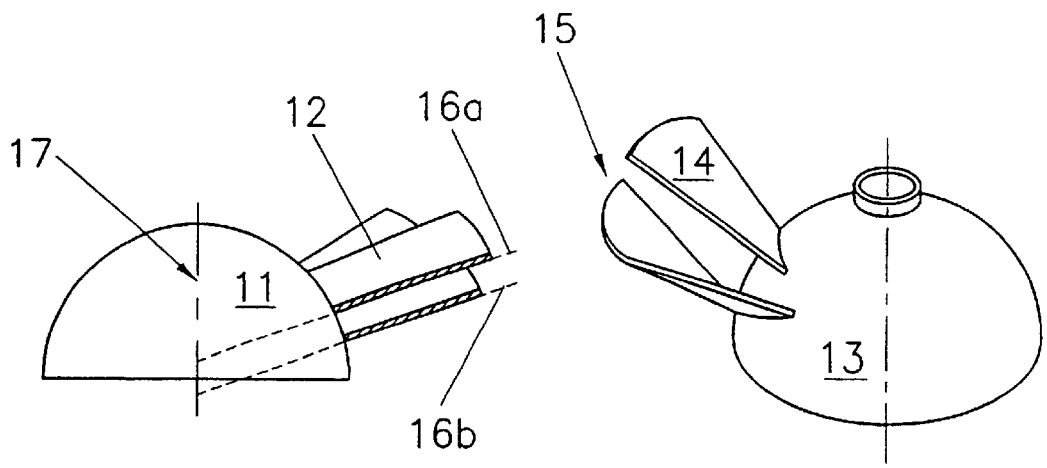
Figure 3.
Figure 2.
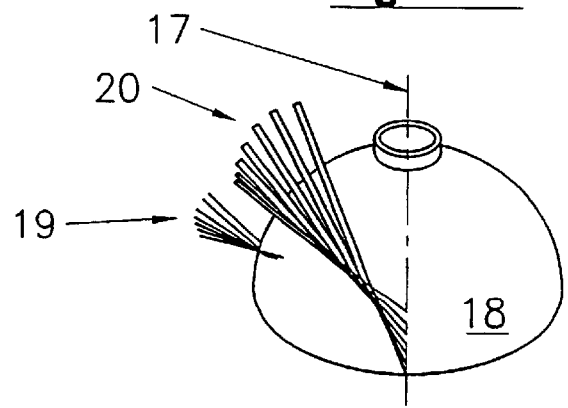
Figure 4.

MOULD FOR THE MANUFACTURE OF A FAN HAVING HUB AND A PLURALITY OF HELICAL BLADES EXTENDING FROM THE HUB

FIELD OF THE INVENTION

This invention relates to a mould which allows ready manufacture of a fan which has a hub and a plurality of helical blades extending from the hub. The mould can be a two-part mould and is able to form a fan which can have multiple overlapping blades. In this manner, fans can be moulded readily from any suitable mould material, e.g. plastics or metal.

BACKGROUND ART

Conventional axial flow fans are relatively easy to mould. A two-part mould may be employed and each part of the mould moves directly away from its counterpart to eject the newly formed fan. These fans can range in diameter from between 20 mm to up 500 mm. For instance, small cooling fans to cool computer chips can be formed in this manner as can larger diameter fans.

Fans which have blades which overlap each other when viewed in plan cannot easily be moulded using a two-part mould as described above. That is, it is not possible to simply rotate the two mould parts to free the mould parts from the fan blades. It is also found that fans having helical blades are not able to be moulded in a manner which is used for conventional axial flow fans.

It is known to mould fans having a more complex blade shape and profile. These moulds cannot be opened simply by drawing the two parts away from each other. Instead, the moulds need to be mechanically rotated which forces the parts to come away from each other in the axial direction. This type of mould arrangement does allow fans to be made having a slight degree of blade overlap, but the process is unsuitable for fans having quite significant blade overlap. Fans having overlapping blades have advantages in supplying a higher volume and/or pressure of air and these fans find particular suitability in cooling of computer chips and also other uses where a high volume air flow is required.

It is well-known to manufacture a variety of plastic objects using a two-part mould where the moulds have to be separated with rotation. For instance, when moulding plastic caps or plastic bottles, the mould halves cannot disengage by simply pulling them apart and instead additional mechanical means is required to rotate the mould while it is being pulled apart. This requires additional fairly complex powered components, and it would be an advantage to have a mould system where the mould components can be separated with rotation but where there is no additional external mechanical means required to rotate the article out of the mould.

OBJECT OF THE INVENTION

It is an object of the invention to provide a mould which allows manufacture of fans having a hub and a plurality of helical blades extending from the hub and which may overcome the abovementioned disadvantages or provide the public with a useful or commercial choice.

In one form, the invention resides in a mould for the manufacture of a fan having a hub and a plurality of helical blades extending from the hub, the mould having blade moulding cavities which are formed such that (a) any imaginary line extending from the rotational axis of the fan to be formed in the mould and through the blade cavity from the blade root to the blade tip intersects the rotation axis at the same angle as any other imaginary line extending in a similar manner, (b) all the imaginary lines are identical in curvature, or are all linear, and, (c) any said imaginary line can exactly replace any other said imaginary line.

In one form, the imaginary lines are all identical and linear to allow a fan to be moulded having blades which extend in a helical manner about the hub but where the blades themselves are linear between the blade root and the blade tip.

In another form, the imaginary lines are all identical and are curved. In this form, the mould can manufacture a fan having blades which extend in a helical manner about the hub but where the blades are curved either in a simple curve or in a complex curve between the blade root and the blade tip.

In another form, the blade cavities overlap each other such that the formed fan has overlapping blades. By having the cavities formed in the manner described above, a fan having overlapping blades can be mass produced from settable mouldable material (e.g. plastic) using a two-part mould.

Preferably, the mould has a hub cavity a part of which is spherical or conical. For instance, the hub cavity can have a first part which is generally cylindrical, and a second part which is spherical or conical or otherwise tapering, with the blade cavities being such that a single formed blade can extend over a cylindrical part and a spherical or conical part while still allowing the fan to be injection moulded or otherwise moulded using a simple two-part mould. Previously, fans having blades which overlapped and which extended over a spherical or conical hub portion were extremely difficult if not impossible to readily mass produce using a two-part mould.

The blade cavities in the mould can be formed such that any point on the formed blade tip edge is the same distance from the rotation axis of the fan as any other point.

The mould can be a two-part mould where the two parts come together to define at least part of the above mould cavities. With the mould cavities being as described above, it is now possible to have the two mould parts merely pulled away from each other without requiring any external separate mechanical rotation means. The newly formed fan in the mould can provide surfaces that pressure can be applied to, to cause auto rotation of one of the mould parts (and possibly both of the mould parts) as the parts are pulled away from each other. This can be made possible due to the particular configuration of the mould cavities as described above. One or both of the mould parts can rotate freely which allows the mould parts to auto rotate as the parts are pulled away from each other.

BRIEF DESCRIPTION OF THE DRAWINGS

Embodiments of the invention will be described with reference to the following drawings in which FIG. 1 is a plan view of a fan having overlapping blades attached to a hub having a hemispherical front portion and a generally cylindrical rear portion.

FIG. 2 illustrates a fan hub with only two blades attached to show more clearly how the blades are overlapping but separate from each other to define a flow passage between adjacent blades.

FIG. 3 is a side view of a hub with some attached blades and illustrating imaginary lines extending from the rotation axis.

FIG. 4 illustrates a number of imaginary lines or rods which can be used to define part of the mould cavity.

BEST MODE

Figure 5:
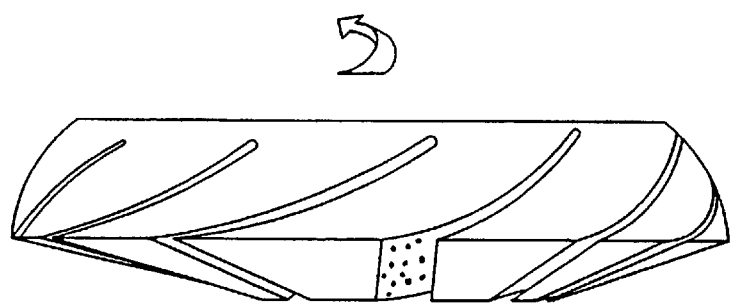
FIG. 5 illustrates one part of a two part mould.

Referring initially to FIGS. 1 to 4. FIG. 1 is a plan view of a fan 10 having a central hub 11 and a plurality of partially overlapping blades 12. This type of fan is known but previously needed to be manufactured by individual attachment of each blade 12 to hub 11. The present invention allows the fan illustrated in FIG. 10 to be easily mass produced from plastic or molten metal using a mould.

In the embodiment, the mould that allows manufacture of a fan illustrated in FIG. 1 is a two-part mould and has voids or cavities which define the blades 12 of the fan, and voids or cavities which define hub 11 of the fan. The moulds will be described in greater detail below.

In the present invention, the blade cavities are formed in a particular manner which allows fans having overlapping helical blades (but also other fans) to be mass produced using a two-part mould.

FIG. 2 depicts a fan hub 13 with only two blades 14, 15 attached for clarity in the drawings. In FIG. 2, the blades are clearly illustrated as being spaced apart from each other to define a flow passage between the blades. Each blade is curved and extends helically over the hub 13. It can be seen from FIGS. 1 and 2 that the blade shape and the complexity of the fan is such that it is not an easy fan to mould using a two-part mould unless special techniques are used. It can be seen that a simple helical pathway of disengagement will not work due to the blade complexity.

Referring to FIG. 1, there is illustrated a plurality of imaginary lines 16A, 16B etc which emanate from the rotation axis or common dead centre 17 of the fan 10. Imaginary lines 16A, 16B etc extend out through one of the blades 12.

FIG. 3 illustrates a side view of imaginary lines which are the same as those illustrated in FIG. 1 and also with a cut-away of two of the blades 12. The imaginary lines 16A, 16B, as illustrated, are parallel. The two imaginary lines in FIG. 3 are identical to any two of the imaginary lines depicted in FIG. 1, however viewed from the side.

If all the imaginary lines 16, as illustrated in FIG. 1, are exactly the same angle from each other, and as viewed in side elevation in FIG. 3, are exactly the same distance apart and parallel, then a true helical pathway is formed.

Therefore, the imaginary lines, by radiating out from the axis of rotation 17 are all at the same angle with respect to each other, and when viewed from the side as illustrated in FIG. 3, the lines are parallel. The parallel lines, as illustrated in FIG. 3, can be at any angle to the rotation axis 17 which includes perpendicular to axis 17.

If additional imaginary lines, as illustrated in FIG. 3, while remaining parallel to each other, were not the same distance apart, then a cordwise curvature will be created in the blade that each of the imaginary lines passes through.

If the imaginary lines, as illustrated in FIG. 1, are not of an identical angle relative to each other, a cordwise curvature will be given to the blade.

If an imaginary line passing through the leading edge and the trailing edge of each blade is one point of a substantially perfect helix, then any imaginary lines that could fall on a true helix or scribed a pathway of a true helix, will be found between the leading and trailing edge but may not lie on the surface or within the blade.

FIG. 4 illustrates these imaginary lines, which extend through a hub 18, and are seen as fine lines in the left-hand blade 19, but in the right-hand blade 20 are seen as rod-like cones which all extend to the axis of rotation 17. If these imaginary lines were followed, they will create a blade shape which conforms to the voids in a mould illustrated in FIG. 5. A fan with blades of the shape conforming to the voids depicted in the mould of FIG. 5 would be difficult to rotatively disengage from the mould as it would jam due to the blade curvature being a curvature which has not followed the path of a true helix.

Figure 6:
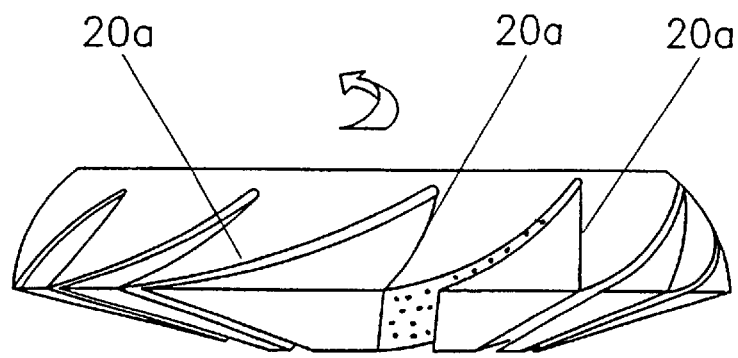
FIG. 6 illustrates voids in a mould according to an embodiment of the invention.

The solution, which forms part of the invention, creates a mould which is able to, in two parts, create a fan with multiple overlapping blades of a complex shape. The solution is partially illustrated in FIG. 6. FIG. 6 illustrates a shaded and an unshaded area each becoming part of one half of the two-part mould. There are extra lines 20A introduced which scribe the pathway of a true helix. The reason this pathway needs to be helical is that at the first moment of disengagement, each said mould half must be able to disengage rotatively and axially simultaneously. The same voids 20 are left intact which can be filled with any material injectable when molten, or allowed to run in when molten.

Figure 7:
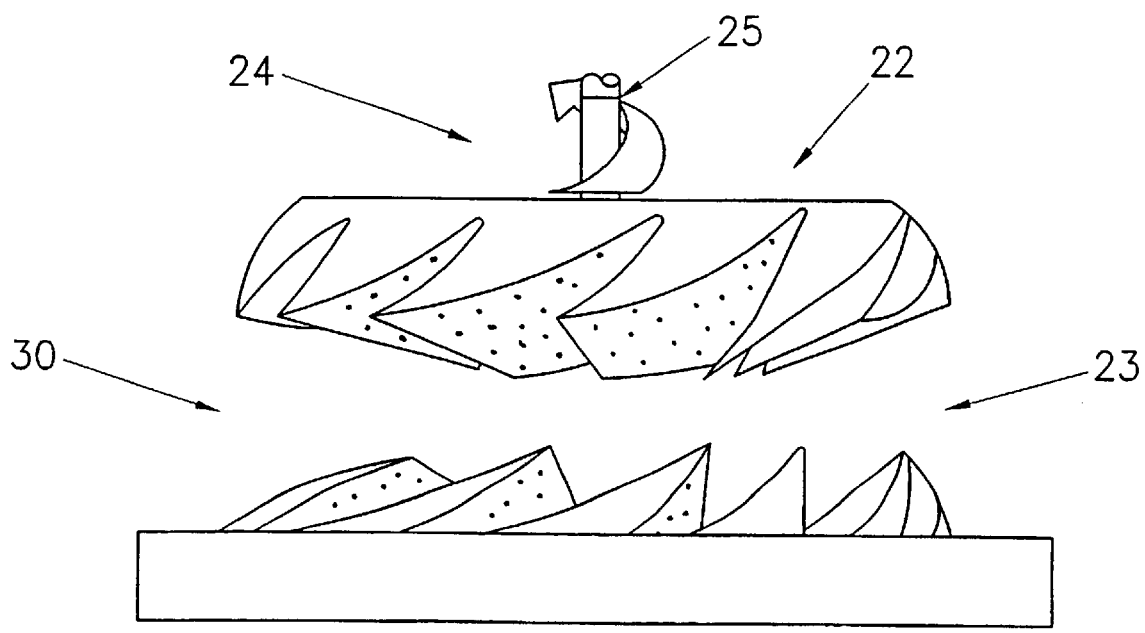
FIG. 7 shows a two-part mould disengaged and according to an embodiment of the invention.

Referring to FIG. 7, there is illustrated a two-part mould having an upper part 22 and a lower part 23. The two parts are disengaged and rotation of upper part 22 about rotation axis 24 as it approaches lower parts 23 will engage the sections while leaving the voids intact and ready for filling. Upper part 22 has a spigot 25 extending from the top. This spigot is enclosed in a bore and is held in such a manner to allow upper parts 22 to freely rotate relative to spigot 25.

In many applications, this upper part 22 when simply drawn axially away from the bottom part 23 will rotate spontaneously to disengage. The reason for this is that the two helical surfaces are matched identically forming a good support, one for another functioning to position the top and bottom parts relative to each other. It can also be seen that the leading and trailing edge portions of the mould conform to two sections of the true helix whilst still allowing the voids that form the blades from the molten material to deviate from the helical pathway.

It should also be noticed that if the engagement of the mould parts is left to occur automatically, then they are meant to simply self-position. In effect, if the mould halves are made with precision it does not matter which sections engage the other sections.

The ingates and outgates for the molten material may be found at any position and are not shown for clarity, as they are not part of the invention.

It should also be noted that what is depicted is only an example of a particularly fine pitched fan and that a coarse pitched fan would make the method even more viable and effective.

It should be noted that no particular type of liquid material is preferred; it may be liquid plastics or molten metals or any other material that forms the fan.

A fan can now be manufactured where the blades and hub are integral. This is not shown as it is not necessary as the hub may vary from being a spherical hub to conical or some other shape as long as it is disengagable.

This type of mould may be made from any material that is required to effectively process liquid material that will form the fan itself. It is important to understand that this mould is effective only for fans where the blade curvature does not deviate too far from partial helical paths otherwise there is no possibility of disengagement. It is also evident as with conventional injection moulding equipment many fans are usually made at one time especially if they are very small fans that this mould is meant to be employed in the same way.

A cap (not illustrated) covers the top mould of FIG. 7 conforming to the outside shape, which is not limited to the spherical shape shown. This cap confines the liquid blade material and forms the blade tips. There may be any number of blade forming voids.

A further embodiment of the invention is now described.

FIG. 7 illustrates a number of sharp members 30 projecting upwardly towards the top part of the mould.

If a fan is made by the method described, these members would need to be attached to the lower part of the mould 23 by bolts or some other secure means and removed before the moulded fan could be removed from that mould.

This is acceptable especially with a metallic, more expensive fan but is time consuming. If it is desired to leave the members intact, a cylindrical hub is necessary.

This further embodiment teaches a simpler means of mould disengagement if the blade shape is changed slightly.

Figure 8:
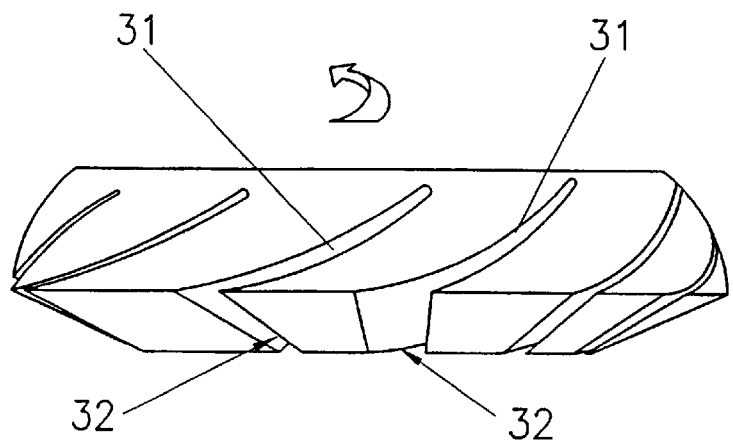
FIG. 8 illustrates a mould part where the mould voids have been widened near the trailing edge end.

Referring to FIG. 8, there is illustrated blade forming voids 31 which have been widened near the trailing edge end 32. This means that the members projecting from the top part of the mould would conversely have a narrowed section near the same area where the blade was thickened.

Figure 9:
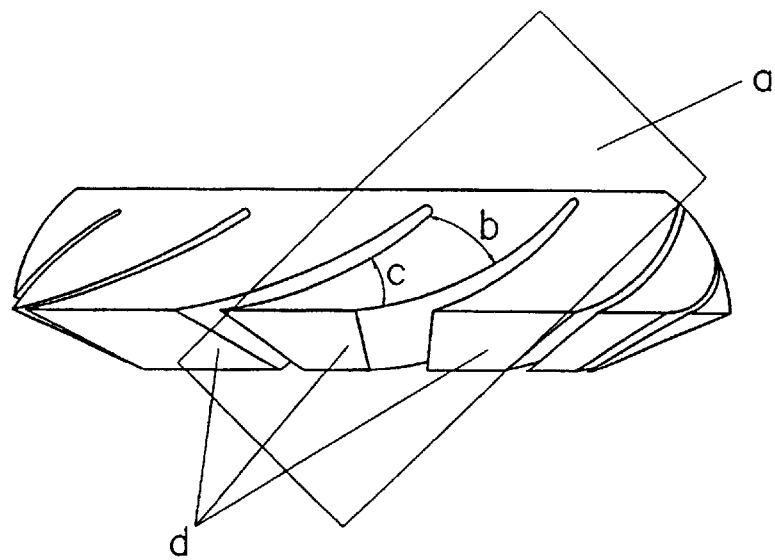
FIG. 9 illustrates the mould of FIG. 8 with particular emphasis to a portion of the mould.

FIG. 9 shows a box enclosing just a portion of the mould. Because of perspective considerations it is difficult to depict an idea with drawings so by looking at the section only within the box (a) some points can be noted.

It can be seen that the distance at line (b) is further than the distance at line (c). This means that as long as upon rotatable disengagement as already mentioned, that member would rotatably disengage from a formed fan blade which would now fill the voids in the mould already mentioned.

This again, is still only possible if the fan formed by this mould follows a substantially helical pathway. The degree that the blade would need to be thickened towards its trailing edge will depend on the draft angles required. These may be determined by a number of mechanical factors and chemical factors of the liquid material being injected into the voids.

The surfaces shown as (d) in FIG. 9 may be substantially conical. It is meant that the underside mould (not shown) would have a conical surface conforming to those surfaces (d). In this way, the liquid material would flow into the blade voids and the underside conical surface already mentioned would prevent the flow out of the area of the blade trailing edges.

As already mentioned, a cap is attached over the top part of the mould, which contains the liquid material to within the voids in the mould. This again is not shown for the sake of clarity.

In this form of the invention, as the first form there may be a mechanical means employed to assist in disengaging the two mould halves. There are a number of mechanisms that can achieve this. It is meant that ideally, the disengaging mechanism be automatic, in that as one half of the mould is drawn away from the other half, an automatic rotation occurs to one part of the two part mould. A ball, which extends into a groove in the spigot already described, may achieve this. That groove may have a pathway that deviates from a straight line and may conform to the pathway required to disengage one half of the mould from the other half.

A further method of automatic rotational disengagement may be where the aforementioned cap, which contains the blade tips and prevents the liquid material from escaping from the voids at the tips, may extend past the perimeter of the bottom half of the mould which is shown in FIG. 7.

The outside of the bottom mould may possess guides of some kind, perhaps smooth pins which engage grooves inside the overlapping portion of the top mould. The groove may be in the outside of the bottom mould and the pins may be inside the overlapping portion of the top mould. In this way, the two halves of the mould upon axial withdrawal from each other are caused to rotate relative to each other. The rate of rotation and pitch are determined by the pins, grooves or ball bearing in grooves and substantially follows the substantially helical path of the fan blades.

This may also function to prevent undue strain being placed on the newly formed fan include the blade sections. It is preferably to have an automatic rotational disengagement activated by simple withdrawal of one half of the mould from the other in an axial direction, but assisted disengagement by any other means may be employed, although is not preferred.

Figure 10:
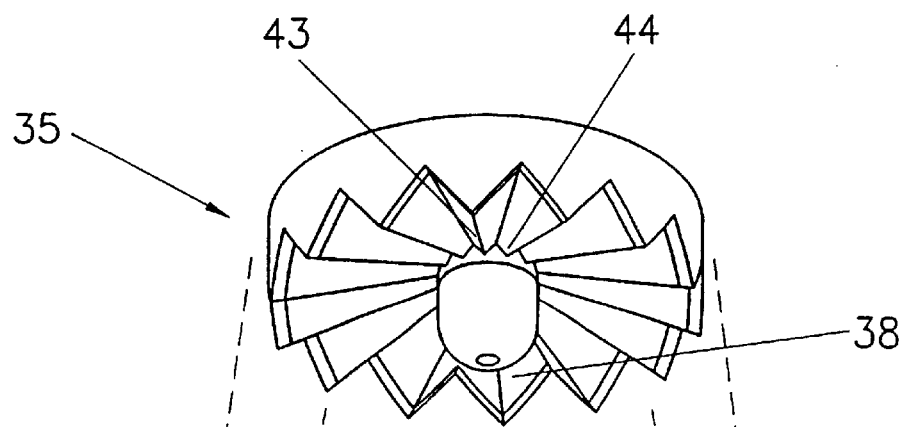
FIGS. 10, 11 and 12 are illustrated together with FIGS. 10 and 12 being two mould halves which are able to produce a fan illustrated in FIG. 11.
Figure 11:
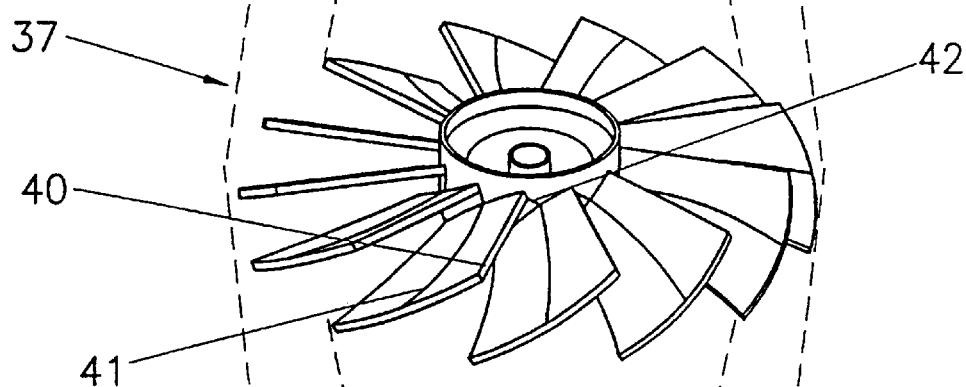
Figure 12:
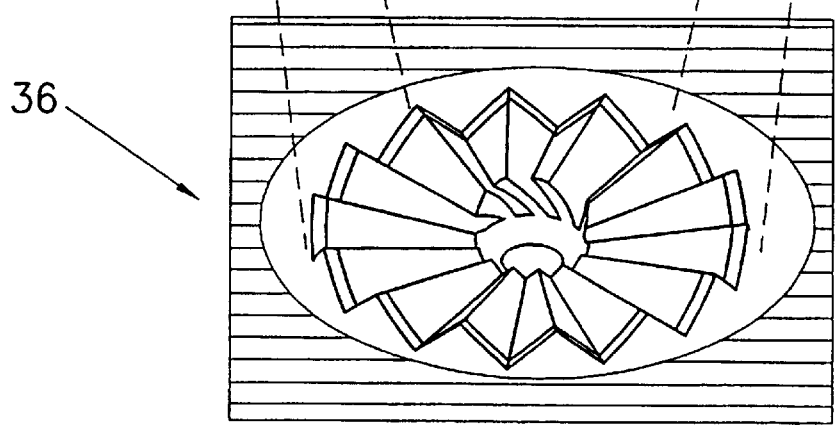

Referring to FIGS. 10 and 12, these figures illustrate two mould halves 35, 36 which are able to produce fan 37 illustrated in FIG. 11. When mould halves 35 and 36 are engaged, a liquid material is injected into the voids created within the mould. That material may be liquefied due to heat or pressure or a combination of both and may be of any material. A liquid material, which hardens due to chemical action, may also be employed. A member 38 is seen in FIG. 10. Member 38 is rotatable relative to the rest of the mould.

Member 38 may be of any configuration that is disengagable. It may also have surface features that mechanically grip the solidifed material so that when the mould half 35 is withdrawn from the mould half 36, the fan 37 is rotatably disengaged from 36. Member 38 is freely rotatable and rotates with the fan 37 until it is disengaged from 36 and only then is the fan 37 pushed off member 38 automatically.

This is achieved by member 38 being able to be slightly withdrawn to within the main body of mould half 35.

While the production of the helical pathway, which follows along the interior of each blade, has already been described in detail, other points are noted. Ideally, any fan should have a trailing edge that has a relatively gentle taper. To achieve this kind of fan, a point must be chosen at a given distance from the blade trailing edge 40 and from that point back to the rear of the hub must be substantially cylindrical. This is so that the mould can disengage correctly. Join marks can be seen at 41 and 42 on the back of the blade trailing edge 40.

It should be noted that the direction of disengagement of the fan from the mould is anticlockwise when looking at the back of the fan 37.

When mould half 35 engaged mould half 36, it is the meeting of the corners 43, 44 which produce the join marks 41, 42 in the fan 37. Therefore, marks 42, whether it is visible or not in the final product, lies on a substantially cylindrical surface.

Line 42, visible or not, could not extend around to the forward part of the hub as that would mean that the substantially sharp edge 43 and point 44 would be found on a spherical surface and disengagement of mould half 35 from mould half 36 would be impossible.

It is possible to make the mould halves 35 and 37 without this cylindrical section of the hub but that would meant that the trailing edges of each blade would cut off abruptly which would not be the best aerodynamically for the fan.

Figure 13:
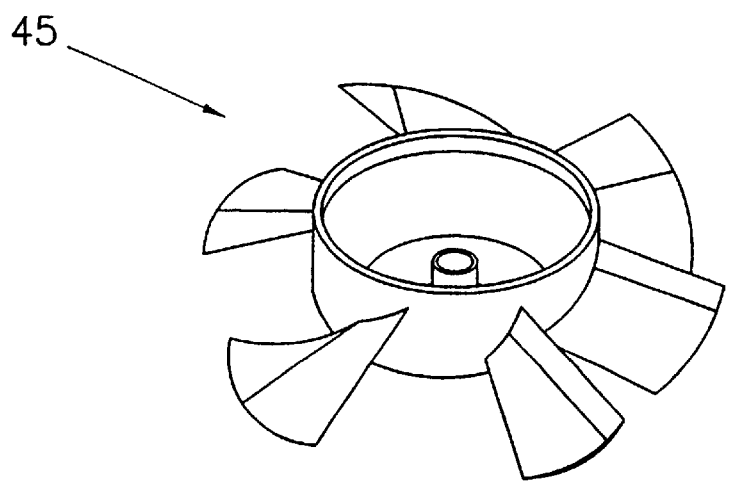
FIG. 13 illustrates a fan having helical blades extending from the hub where the blades do not overlap.

FIG. 13 illustrates a fan 45 that does not have overlapping blades. If it is desired to make a mixed flow fan of this type, then the helical fan mould may be employed if it had a cylindrical hub.

Fan 45 could be made by a simply two-part mould, if the blades did not extend around towards the front of the hub and lay over a substantially spherical or perhaps conical area.

The fan would commonly be called a mixed flow fan possessing backward swept blades. It is a type of mixed flow fan where the air enters in the axial direction and also discharges axially after momentarily deviating from axial through the blades. This type of fan is known to be able to generate relatively high pressures and flows.

This kind of fan also normally has the blades attached to a conical, spherical or partially spherical type hub as this may give better results than if the blades where attached to a completely cylindrical hub then the present method of manufacturing described herein would not be necessary.

The point to understand is that this type of mixed flow fan is usually a very expensive fan to make simply because a two-part mould cannot normally be employed.

With this method described herein, fan 45 can be manufactured with the blades projecting from the spherical forward portion and also the section of cylindrical hub and this may reduce the cost of manufacture significantly.

Another reason to employ the helical fan mould to a fan similar to fan 45 is where the blades may overlap but to a lesser degree than fan 37.

FIGS. 1 to 4 describe the principals or rules in constructing a helical pathway. The important feature to note is that the imaginary lines depicted in FIG. 1 and FIG. 3 and also the rods shown in FIG. 4 need not be straight. Whatever shape or curvature any one line takes it must be identical to all other lines. In other words, if any one line no matter what its shape is rotated about the axis and its point of origin on the axis is moved forward or rearwardly, then any one line curved or otherwise would be able to exactly replace any other line having its point of origin from the axis. As with the straight imaginary lines in FIG. 1 and FIG. 3 and the rods in FIG. 4, each of these new curved lines is at an exact angle from each other as every other line when viewed from the front as in FIG. 1 and each would have to be parallel to each other at exact distance apart as when viewed from the side as in FIG. 3.

In this way, a much more complex blade shape can be created which may give increased aerodynamic advantages to the fan formed therefrom. It should also be noted that this idea is applicable to fans 37 and 45.

Returning to FIG. 3, it can be seen that the imaginary lines could be at any angle from the axis of rotation or could be perpendicular to the axis.

This would still form a helix, but the blades would be substantially perpendicular to the axis and also to a substantially cylindrical hub.

This would produce a fan of both 37 and 45 which, if rotated counterclockwise (in the running situation as a fan) in the view shown, could be a conventional axial flow fan with substantially classical airfoil blades. Classical airfoil blades are thicker closer to their leading edge than trailing edge and in this case 40 of FIG. 11 would be the leading edge.

This moulding method would not be needed in most circumstances as a conventional two-part mould is adequate but if any degree of overlap was required, the helical fan mould could achieve that. It should be noted that in this last case the hub, be it cylindrical, spherical or ellipsoid would need to have its largest diameter near its front rather than rear, though the difference need only be slight.

The helical fan mould may work by having the two parts merely pulled away from each other. The newly formed fan itself provides surfaces that pressure can be applied to, to cause auto rotation. The newly formed fan itself is held by the newly solidified plastic (having flowed into small dimples or projections on the central rotational body). It projects from the centre of the male mould but rotates relative to the male mould so neither the female part of the mould or die, or the male part of the die move rotationally but only move away from each other along their axis. The central member or body freely auto rotates with the fan. Once the male and female parts move a certain distance apart, the fan can be automatically forced off the central rotating body.

It should be appreciated that various other changes and modifications can be made to the embodiment described without departing from the spirit and scope of the invention.

What is claimed is:

1. A mould for the manufacture of a fan having a hub and a plurality of helical blades extending from the hub, the mould having blade moulding cavities which are formed such that any linear imaginary line extending from the rotational axis of the fan to be formed in the mould and through the blade cavity from a blade root to a blade tip intersects the rotation axis at an identical angle as any other imaginary line extending in a similar manner, wherein the mould is comprised of two mould parts, and wherein the parts are separated without external assisted rotation, at least one said part being freely rotatable such that upon separation of the said mould parts, the formed fan causes the one said part to autorotate as it is pulled away from the other said part.

2. The mould of claim 1, including a member which is rotatably attached to one of the mould parts and which has means to grip the solidified fan material, whereby, upon separation of the mould parts, the member rotates with the formed fan until the fan disengages with the other mould part after which the formed fan is removed from the member.

* * * * *